United States Patent
Witizius et al.

(10) Patent No.: US 9,710,541 B2
(45) Date of Patent: Jul. 18, 2017

(54) CONVERSION OF AN OBJECT FOR A HARDWARE DEVICE INTO HEALTH CONTROL INFORMATION

(75) Inventors: Andrew L. Witizius, Fort Collins, CO (US); Robert Lee Crane, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 14/384,727

(22) PCT Filed: Jun. 28, 2012

(86) PCT No.: PCT/US2012/044658
§ 371 (c)(1),
(2), (4) Date: Sep. 12, 2014

(87) PCT Pub. No.: WO2014/003762
PCT Pub. Date: Jan. 3, 2014

(65) Prior Publication Data
US 2015/0039798 A1    Feb. 5, 2015

(51) Int. Cl.
*G06F 19/00*      (2011.01)
*G06F 17/30*      (2006.01)
*G06F 1/20*       (2006.01)
*G06F 13/40*      (2006.01)

(52) U.S. Cl.
CPC ........ *G06F 17/30607* (2013.01); *G06F 1/206* (2013.01); *G06F 13/4072* (2013.01); *G06F 17/30289* (2013.01); *Y02B 60/1275* (2013.01)

(58) Field of Classification Search
CPC .................. G06F 17/30607; G05B 19/406
USPC .................. 710/301; 700/108; 702/182
See application file for complete search history.

(56) References Cited

U.S. PATENT DOCUMENTS

| | | | | |
|---|---|---|---|---|
| 5,161,110 A | * | 11/1992 | Dorchak | G05B 19/4063 700/108 |
| 5,455,931 A | * | 10/1995 | Camporese | G06F 17/5031 713/501 |
| 6,169,992 B1 | * | 1/2001 | Beall | G06F 17/30607 |
| 6,212,644 B1 | | 4/2001 | Shimoda et al. | |
| 6,665,163 B2 | | 12/2003 | Yanagisawa | |
| 6,681,227 B1 | * | 1/2004 | Kojima | G06F 17/30864 |

(Continued)

FOREIGN PATENT DOCUMENTS

KR    10-2002-0060796 A    7/2002

OTHER PUBLICATIONS

Alfredo Milani Comparetti, "SpeedFan 4.42," 2011, pp. 1-9, Available at: <web.archive.org/web/20110208170633/http://www.almico.com/speedfan.php>.

(Continued)

*Primary Examiner* — Paul R Myers
(74) *Attorney, Agent, or Firm* — HP Inc. Patent Department

(57) ABSTRACT

Examples disclosed herein relate to conversion of an object for a hardware device into health control information. Examples include acquiring, from an object-oriented database, an object for a hardware device including an operational parameter value determined by the hardware device. Examples further include converting the object into health control information useable by a health controller.

19 Claims, 4 Drawing Sheets

(56) References Cited

U.S. PATENT DOCUMENTS

| | | | | |
|---|---|---|---|---|
| 6,738,811 | B1* | 5/2004 | Liang | H04L 41/147 709/224 |
| 6,742,141 | B1* | 5/2004 | Miller | G06F 11/0748 706/45 |
| 6,826,456 | B1 | 11/2004 | Irving et al. | |
| 7,185,211 | B2 | 2/2007 | Loughran | |
| 7,206,960 | B2* | 4/2007 | Barr | G06F 1/206 370/395.21 |
| 7,634,579 | B1* | 12/2009 | Kalbarga | G06Q 10/109 709/224 |
| 7,908,493 | B2 | 3/2011 | Bieswanger et al. | |
| 8,108,580 | B1* | 1/2012 | Chatterjee | G06F 13/00 710/74 |
| 8,527,997 | B2* | 9/2013 | Bell, Jr. | G06F 9/5094 713/320 |
| 8,600,917 | B1* | 12/2013 | Schimert | G06N 5/00 706/14 |
| 2003/0091002 | A1 | 5/2003 | Oliver et al. | |
| 2005/0049825 | A1* | 3/2005 | King | H04L 43/0817 702/177 |
| 2007/0064623 | A1 | 3/2007 | Brahmaroutu | |
| 2008/0046766 | A1* | 2/2008 | Chieu | G06F 1/206 713/300 |
| 2008/0307238 | A1 | 12/2008 | Bieswanger et al. | |
| 2010/0103147 | A1 | 4/2010 | Sumpter | |
| 2010/0229014 | A1 | 9/2010 | Blackburn et al. | |
| 2011/0072293 | A1 | 3/2011 | Mazzaferri et al. | |
| 2013/0290758 | A1* | 10/2013 | Quick | G06F 1/3203 713/323 |

OTHER PUBLICATIONS

C.C. Hameed, "WMI Architecture Basics," Jun. 12, 2007, pp. 1-3, Ask the Performance Team Blog, Available at: <blogs.technet.com/b/askperf/archive/2007/06/12/wmi-architecture-basics.aspx>.

Chrisitan Diefer, "Dell Inspiron/Latitude/Precision Fan Control Utility," May 22, 2006, pp. 1-35, Available at: <diefer.de/i8kfan/index.html>, <diefer.de/i8kfan/manual31/index.html>, <diefer.de/i8kfan/faq.html>.

CNET Staff, "GPU-Z," CNET Editors' Review, Jan. 13, 2009, pp. 1-7, CNET, Available at: <download.cnet.com/GPU-Z/3000-2094_4-10788513.html>.

GPU-Z, 2011, pp. 1-3, TechPowerUp, Available at: <web.archive.org/web/20110716202432/http://www.techpowerup.com/gpuz/>.

IBM, "IBM Systems Director for IBM i Planning, Installation, and Configuration Guide," Version 6.2.1, GI11-8710-05, 2010, pp. 1-146, Available at: <publib.boulder.ibm.com/infocenter/director/v6r2x/topic/com.ibm.director.main.helps.doc/fqp0_bk_install_gde_ibmi.pdf>.

International Search Report and Written Opinion, International Application No. PCT/US2012/044658, Feb. 28, 2013, pp. 1-7.

Microsoft, "Common Information Model," retrieved Jun. 14, 2012, Dev Center—Desktop, 1 page, Retrieved from: <msdn.microsoft.com/en-us/library/windows/desktop/aa389234(v=vs.85).aspx>.

Microsoft, "WMI Architecture," retrieved Jun. 14, 2012, Dev Center—Desktop, pp. 1-3, Retrieved from: <msdn.microsoft.com/en-us/library/windows/desktop/aa394553(v=vs.85).aspx>.

Nvidia Corporation, "NVWMI v2.4 API Reference Documentation," Nov. 2011, pp. 1-97.

Wikipedia, "Windows Management Instrumentation," Jul. 16, 2011, pp. 1-8, Available at: <web.archive.org/web/20110716233401/http://en.wikipedia.org/wiki/Windows_Management_Instrumentation>.

* cited by examiner

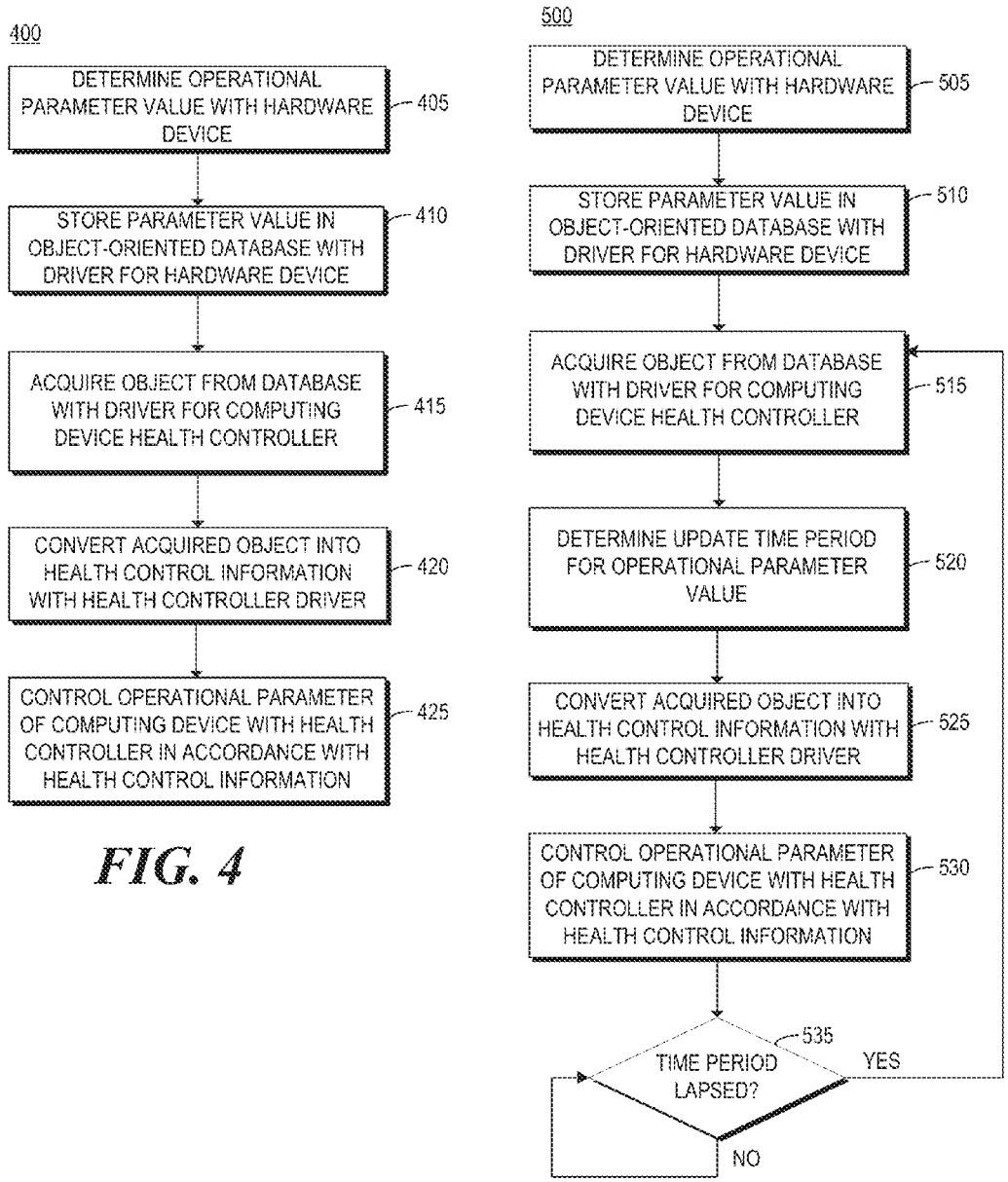

CONVERSION OF AN OBJECT FOR A HARDWARE DEVICE INTO HEALTH CONTROL INFORMATION

CROSS-REFERENCE TO RELATED APPLICATION

This application is a national stage application under 35 U.S.C. §371 of PCT/US2012/044658, filed Jun. 28, 2012.

BACKGROUND

A computing device such as a desktop computer, notebook computer, or the like, may monitor physical characteristics of its operation, such as heat generated, power consumed, and the like, for various components of the computing device. Such a computing device may also attempt to maintain such physical characteristics within desired operational ranges. For example, a computing device may operate a cooling fan to maintain the operating temperature of components of the computing device within desired operational ranges.

BRIEF DESCRIPTION OF THE DRAWINGS

The following detailed description references the drawings, wherein:

FIG. 4 is a flowchart of an example method for controlling an operational parameter of a computing device with a health controller of the computing device; and FIG. 5 is a flowchart of an example method for acquiring an updated object for a hardware device after the lapse of an update time period.

DETAILED DESCRIPTION

Figure 1:
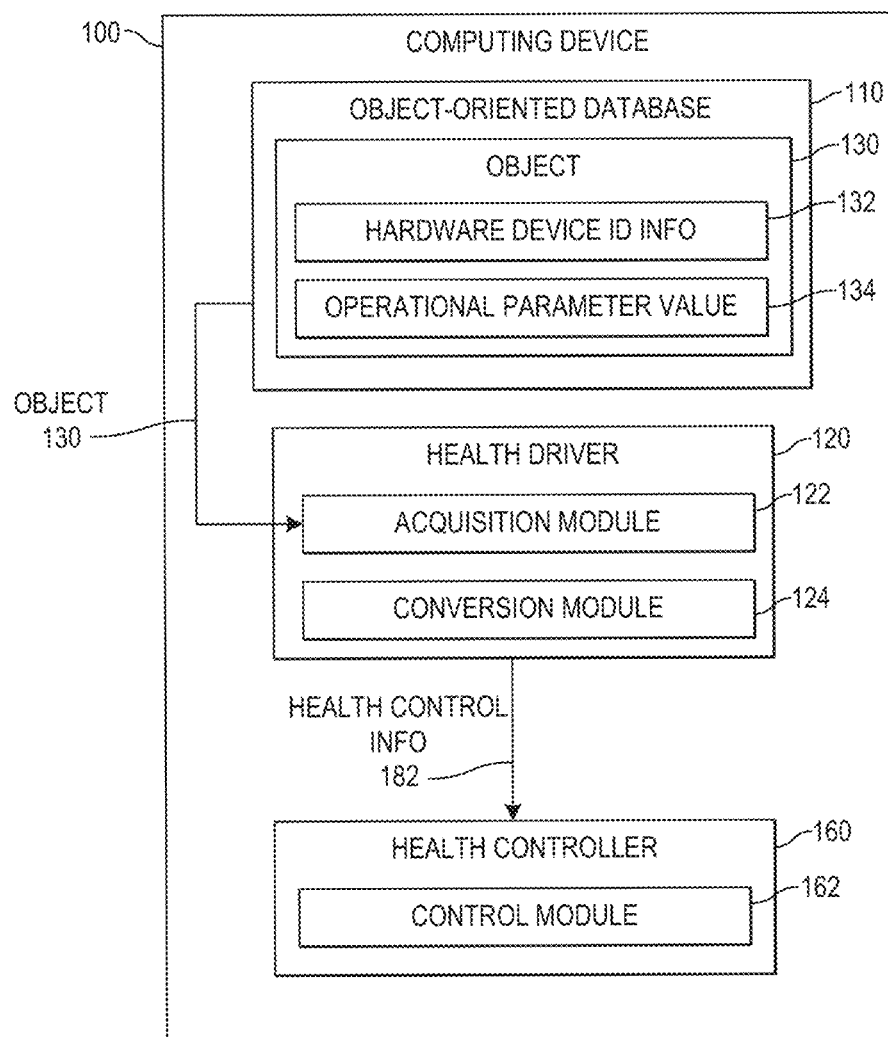
FIG. 1 is a block diagram of an example computing device including a health controller and a health driver to interface with the health controller.

As noted above, a computing device may attempt to maintain physical characteristics of various computing device components within desired operational ranges. For example, a health controller of a computing device may monitor operational parameters of various components of the computing device, such as temperature, power consumption, frequency, and the like. In such examples, the health controller may receive readings from various sensors of the computing device, such as temperature and power sensors, and may control operational parameters of the computing device in response to such readings. For example, the health controller may control the speed of cooling fans of the computing device based on readings received from temperature sensors to balance acceptable component temperatures and fan noise levels.

In some examples, expansion cards, such as Peripheral Component Interconnect (PCI) and PCI Express cards, connected to expansion slots of a computing device may have a relatively large impact on operational parameters of the computing device. For example, an expansion card such as a graphics processing unit (GPU) may consume more power than a central processing unit (CPU) of the computing device and may generate much heat. As such, some expansion cards include internal health management functionality to monitor and regulate operational parameters of the expansion card.

With access to the internal measurements taken by an expansion card, a computing device health controller may better manage the overall operational parameters and acoustic performance of the computing device. However, the operational parameter measurements taken internally by an expansion card are often not available to the heath controller of a computing device to which the expansion card is connected. For example, many health controllers include an application-specific integrated circuit (ASIC) that monitors operational parameter measurements from sensors connected directly to dedicated registers of the ASIC. However, many expansion cards have no direct hardware connection to a health controller ASIC when connected to an expansion slot, and do not support hardware interface protocols that might allow a health controller to poll the expansion card for internal measurements.

To address these issues, examples described herein provide a computing device including an object-oriented database to store an object associated with a hardware device including an operational parameter value determined by the hardware device. Examples described herein also include a health driver to acquire the object from the database and convert the object into health control information useable by a health controller of the computing device and representing the operational parameter value determined by the hardware device. In such examples, a device driver for the hardware device, such as an expansion card, may store internal operational parameter measurements in an object of an object-oriented database, and the health driver may obtain the object and provide the measurement to the health controller in a format useable by the health controller.

In this manner, examples described herein may enable communication of operational parameter values determined by an expansion card to be communicated to a computing device health controller without hardware changes to existing expansion cards, use of complex hardware protocols, or device-specific software applications. Moreover, examples described herein may allow a health controller to utilize internal measurements from any expansion card having an associated driver publishing the measurements to the object-oriented database. Additionally, by publishing internal measurements in objects of an object-oriented database, examples described herein may enable a health driver to interpret and appropriately format the measurement for use by the health controller without prior knowledge of the hardware device.

Referring now to the drawings, FIG. 1 is a block diagram of an example computing device 100 including a health controller 160 and a health driver 120 to interface with health controller 160. As used herein, a "computing device" may be a desktop computer, notebook computer, workstation, server, computer networking device, a chip set, or any other processing device or equipment. In the example of FIG. 1, computing device 100 includes an object-oriented database 110, a health driver 120, and a health controller 160.

In the example of FIG. 1, object-oriented database 110 may store an object 130 in database 110. As used herein, an "object" is a collection of information formatted in a data structure suitable for manipulation as an object in object-oriented programming. As such, an object may be referred to herein as an "object-oriented programming object". In some examples, an object may include at least one data field, may be associated with at least one method, or a combination thereof. Additionally, as used herein, an "object-oriented database" is a database to manage and store object-oriented programming objects. Although FIG. 1 shows one object in object-oriented database 110, database 110 may store and manage a plurality of objects.

Object 130 may be associated with a hardware device. In some examples, object 130 may include a hardware device identification field to store hardware device identification information 132 identifying the associated hardware device. In other examples, object 130 may be included within another object to store various types of data for the hardware device. In some examples, the hardware device may be an expansion card connected to an expansion slot of computing device 100. For example, the hardware device may be a PCI expansion card connected to a PCI slot of computing device 100, a PCI Express expansion card connected to a PCI Express slot of computing device 100, or any other type of expansion card connected to a suitable expansion slot of computing device 100. Example expansion cards include, for example, a graphics card or other card including a graphics processing unit (GPU), an audio card, etc. In other examples, the hardware device may be any other type of hardware device of computing device 100, such as a processor, ASIC, storage device, or the like. For example, the hardware device may be a processor, ASIC, or other electronic circuitry of or connected to a motherboard of computing device 100.

In the example of FIG. 1, object 130 may include at least one operational parameter value field to store an operational parameter value 134. As used herein, an "operational parameter value" is a representation of a physical characteristic associated with the operation of a hardware device. An operational parameter value may be a value representing, for example, temperature, fan speed, power, voltage, current, humidity, altitude, etc., associated with a hardware device. In some examples, a hardware device may measure, estimate, or otherwise determine a value of at least one operational parameter for the hardware device. For example, an expansion card may include a temperature sensor to measure a temperature adjacent to a processor of the expansion card, determine a speed of a fan of the expansion card, measure power consumption of the expansion card, or the like, or a combination thereof.

In the example of FIG. 1, object-oriented database 110 may store an operational parameter value 134 for a hardware device, and determined by the hardware device, in an object 130 of database 110 associated with the hardware device. In some examples, database 110 may store the operational parameter value 134 determined by the hardware device in an operational parameter value field of the object 130 associated with the hardware device. For example, database 110 may store a temperature value for an expansion card, measured with a temperature sensor of the expansion card, in an object of database 110 associated with the expansion card. The functionalities of object-oriented database 110 may be implemented in the form of executable instructions encoded on a machine-readable storage medium, in the form of electronic circuitry, or a combination thereof.

In some examples, database 110 may store the operational parameter value determined by the hardware device in a format different than the format in which the operational parameter value is obtained from the hardware device. For example, database 110 may receive the operational parameter value determined by the hardware device from a device driver to interface with the hardware device. In such examples, the device driver may reformat the operational parameter value acquired from the hardware device before it is stored by database 110. In other examples, database 110 may store the operational parameter value determined by the hardware device in the format in which the operational parameter value is obtained from the hardware device.

As noted above, computing device 100 includes a health controller 160. Health controller 160 may include a combination of electronic circuitry and machine-readable instructions to manage operational parameters of computing device 100 in accordance with received operational parameter values. For example, health controller 160 may receive operational parameter values representing temperature, fan speed, power consumption, voltage, current, humidity, altitude, etc., of components of computing device 100 (e.g., a processor, etc.) or connected to computing device 100 (e.g., an expansion card) and directly or indirectly control operational parameters of computing device 100 (e.g., fan speed, power consumption, etc.) in accordance with at least one received operational parameter value.

In some examples, health controller 160 may include a health management ASIC (e.g., a fan controller, a super I/O, etc.) and instructions encoded on a machine-readable storage medium that are executable by the health management ASIC (e.g., health management firmware). In some examples, the machine-readable storage medium may be separate from the health management ASIC, and the health management ASIC may fetch, decode, and execute the instructions stored on the machine-readable storage medium to implement the functionalities described herein in relation to health controller 160.

In the example of FIG. 1, computing device 100 also includes a health driver 120 to interface with health controller 160. Health driver 120 includes an acquisition module 122 and a conversion module 124. In some examples, health driver 120 may include additional modules. Health driver 120 may be a device driver to interface with electronic circuitry (e.g., a health management ASIC, etc.) of health controller 160. As used herein, a "device driver" is information including a set of machine-readable instructions that provide an interface between a hardware device and at least one of an operating system of a computing device and at least one application of the computing device.

In some examples, health driver 120, including any modules of health driver 120, may be implemented in the form of executable instructions encoded on a machine-readable storage medium. As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

Acquisition module 122 may acquire object 130 from database 110. In some examples, module 122 may query database 110 at least once to discover object 130. For example, through at least one query of database 110, module 122 may determine whether database 110 includes any object including an operational parameter value that may be used by health controller 160. For example, module 122 may query database 110 for hardware devices of a specified type (e.g., video cards) connected to computing device 100, identify hardware devices of interest to the health controller, and then query database 110 for which of the hardware devices of interest include an operational parameter value of interest to health controller 160 (e.g., a temperature value). In other examples, module 122 may perform other queries to discover objects of interest in database 110.

After database 110 identifies, in response to a query of module 122, an object including an operational parameter value of interest to health controller 160, module 122 may acquire the object from database 110 to obtain the operational parameter value included in the object. For example, if module 122 determines, through at least one query of database 110, that object 130 includes an operational parameter value of interest to health controller 160, then module 122 may acquire object 130 to obtain operational parameter value 134. For example, module 122 may access object 130 in database 110 using identifying information previously received from database 110 in the query process. In some examples, module 122 may periodically acquire object 130 to obtain updated versions of operational parameter value 134 as it is updated.

Conversion module 124 may convert the acquired object 130 into health control information 182 useable by health controller 160 and representing the operational parameter value 134 determined by the hardware device. In examples in which operational parameter value 134 is in a format useable by health controller 160, module 124 may convert object 130 into health control information 182 by extracting operational parameter value 134 from object 130. In such examples, module 124 may extract value 134 from object 130 and provide value 134 to health controller 160 as health control information 182. In some examples, module 124 may further convert the extracted value 134 into a format in which health controller 160 may receive and utilize the information.

In other examples, module 124 may convert the operational parameter value 134 into health control information 182 in accordance with information included in object 130 that provides context for the operational parameter value 134. In such examples, module 124 may further convert the value 134 into health control information 182 having a format in which health controller 160 may receive and utilize the information. For example, object 130 may include at least one field providing context for operational parameter value 134 such as, for example, the unit of measurement of value 134 (e.g., Celsius, Fahrenheit, etc.), the format of value 134 (e.g., integer, float, etc.), the precision of value 134, a range for value 134 (e.g., minimum and maximum values), a critical limit for value 134, a rate at which the value 134 is updated, and the like. In other examples, additional or other fields may be provided in object 130.

In some examples, module 124 may utilize some or all of this additional information to convert value 134 into health control information 182 useable by health controller 160. For example, module 124 may utilize at least the indicated range values to normalize value 134 to a value representing value 134 as a proportion of the value range indicated in object 130. In addition or alternatively, module 124 may convert object 130 such that the resulting health control information 182 has a format (e.g., an 8-bit value) that may be accepted by a register of health controller 160. For example, module 124 may convert the acquired object 130 into health control information 182 by converting value 134 to an 8-bit value normalized relative to the range values indicated in object 130. In some examples, after converting object 130 into health control information 182, health driver 120 may provide health control information 182 to health controller 160. For example, health driver 120 may store health control information 182 in a register of health controller 160, such as a general-purpose register of a health management ASIC of health controller 160.

In the example of FIG. 1, health controller 160 comprises a control module 162 to control an operational parameter of computing device 100 in accordance with the health control information 182 received from health driver 120. The functionalities of control module 162 may be implemented in the form of executable instructions encoded on a machine-readable storage medium, in the form of electronic circuitry, or a combination thereof. For example, control module 162 may be implemented in the form of instructions encoded on a machine-readable storage medium (e.g., firmware) executable by electronic circuitry (e.g., a health management ASIC) of health controller 160. In some examples, functionalities described herein in relation to FIG. 1 may be provided in combination with functionalities described herein in relation to any of FIGS. 2-5.

Figure 2:
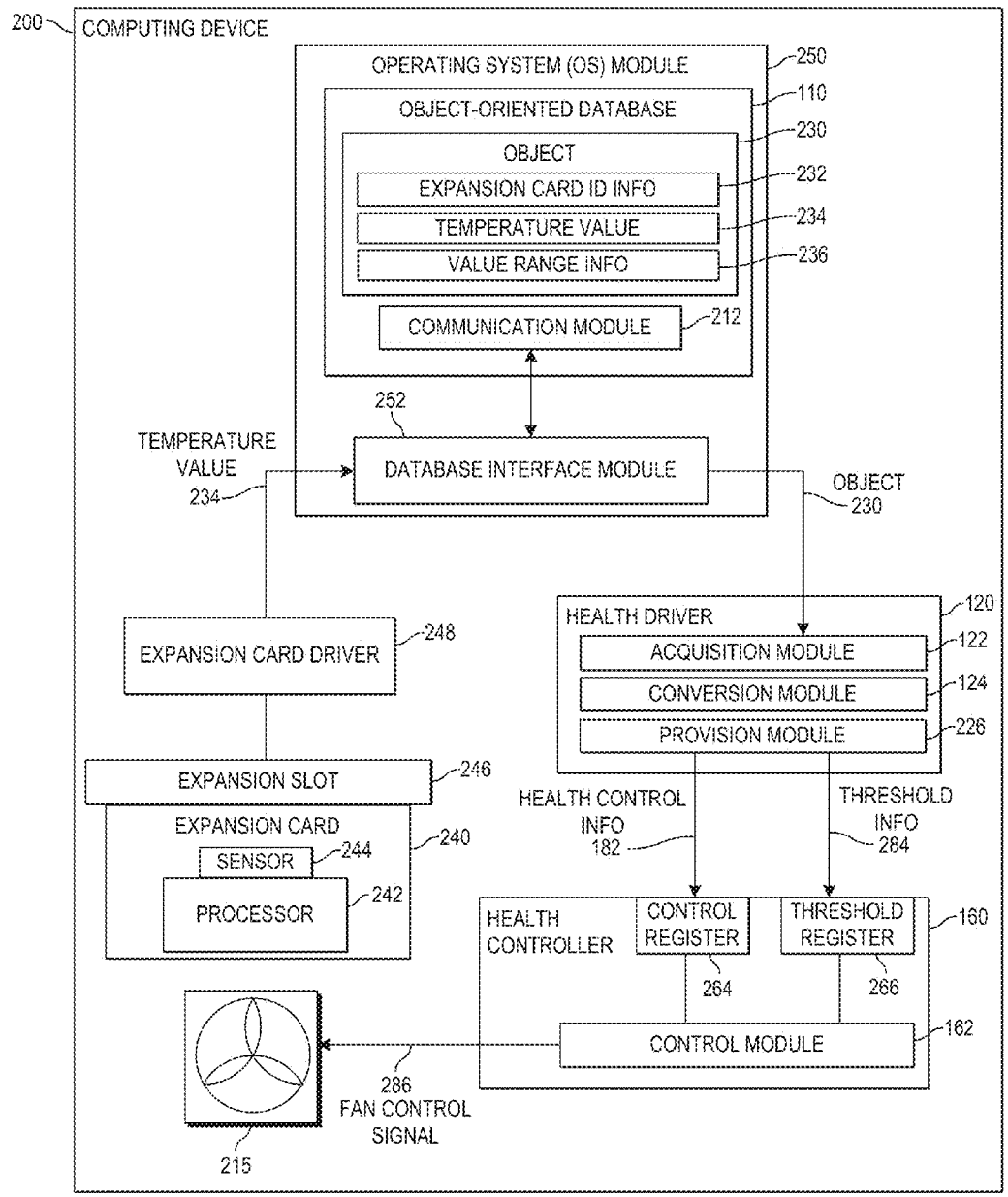
FIG. 2 is a block diagram of an example computing device including an object-oriented database to store an object associated with a hardware device.

FIG. 2 is a block diagram of an example computing device 200 including an object-oriented database 110 to store an object 230 associated with a hardware device. Computing device 200 may include an operating system (OS) module 250 to implement an operating system for computing device 200. In the example of FIG. 2, OS module 250 may include an object-oriented database 110, as described above in relation to FIG. 1, and additionally including a communication module 212. OS module 250 may also include a database interface module 252. The functionalities of OS module 250, including database 110, may be implemented in the form of executable instructions encoded on a machine-readable storage medium, in the form of electronic circuitry, or a combination thereof.

Computing device 200 also includes a health controller 160 and a health driver 120, as described above in relation to FIG. 1. In the example of FIG. 2, health controller 160 additionally includes registers 264 and 266, and health driver 120 additionally includes a provision module 226. Computing device 200 may also include an expansion slot 246 to receive a hardware device. In the example of FIG. 2, an expansion card 240 may be connected to expansion slot 264. Computing device 200 may also include an expansion card driver 248 to interface with expansion card 240. Expansion card 240 may be any type of expansion card as described above in relation to FIG. 1. In some examples, expansion card 240 may include a processor 242 and a temperature sensor 244 adjacent to processor 242 to determine (e.g., measure, detect, etc.) a temperature adjacent to processor 242. As used herein, a "processor" may be at least one of a central processing unit (CPU), a semiconductor-based microprocessor, a GPU, a field-programmable gate array (FPGA) configured to retrieve and execute instructions, other electronic circuitry suitable for the retrieval and execution instructions stored on a machine-readable storage medium, or a combination thereof. In some examples, expansion card 240 may be a graphics card and processor 242 may be a GPU. Expansion card driver 248 may be a device driver for expansion card 240. For example, driver 248 may be a device driver to interface between expansion card 240 and at least OS module 250.

In the example of FIG. 2, object-oriented database 110 may store an object 230 in database 110. Although FIG. 2 shows one object in object-oriented database 110, database 110 may store and manage a plurality of objects. Object 230 may be associated with a hardware device. In some examples, the hardware device may be any hardware device as described above in relation to FIG. 1. In the example of FIG. 2, object 230 may be associated with expansion card 240. In such examples, object 230 may store expansion card identification information 232, identifying the associated expansion card 240, in a hardware device identification field of object 230. In other examples, object 230 may be included within another object that may store various types of data for the associated expansion card 240. Object 230 may also include at least one operational parameter value field to store an operational parameter value. In the example of FIG. 2, the operational parameter value fields of object 230 may include a temperature value field to store a temperature value 234.

As described above in relation to FIG. 1, object-oriented database 110 may store an operational parameter value for a hardware device, and determined by the hardware device, in an object of database 110 associated with the hardware device. For example, database 110 may store a temperature value 234 for expansion card 240, and determined by expansion card 240, in object 230 associated with the expansion card 240.

For example, expansion card 240 may determine a temperature value 234 for expansion card 240 (e.g., a temperature adjacent processor 242) with temperature sensor 244. In some examples, expansion card driver 248 may acquire the determined temperature value 234 from expansion card 240 via expansion slot 246. In such examples, database 110 may receive the temperature value 234 from expansion card driver 248. In such examples, database 110 may store the temperature value 234 for expansion card 240, and determined by expansion card 240, in an operational parameter value field of the object 230 associated with expansion card 240. In some examples, database 110 may store the temperature value 234 determined by the hardware device in a format different than the format in which the temperature value 234 is obtained from the hardware device. For example, expansion card driver 248 may reformat the temperature value 234 acquired from the hardware device before it is stored by database 110. In other examples, database 110 may store the temperature value 234 determined by expansion card 240 in the format in which temperature value 234 is obtained from expansion card 240.

In the example of FIG. 2, an operating system of computing device 200 may include a database interface module 252 to interface between database 110 and applications of computing device 200, such as device drivers. For example, OS module 250 may include database interface module 252. In the example of FIG. 2, expansion card driver 248 and health driver 120 may communicate with database 110 via database interface module 252 of OS module 250. For example, expansion card driver 248 may provide operational parameter values (e.g., temperature values 234) to database 110 via database interface module 252, and health driver 120 may query database 110 and receive objects from database 110 via database interface module 252. In some examples, device drivers, such as drivers 248 and 120, may communicate with database interface module 252 of OS module 250 via Application Programming Interface (API) messages. In some examples, object-oriented database 110 may be separate from OS module 250. In such examples, database interface module 252 of OS module 250 may interface with the database 110 that is separate from OS module 250.

In some examples, database 110 may include a communication module 212 to communicate with applications of computing device 200, such as device drivers, via database interface module 252. For example, communication module 212 may receive operational parameter values from device drivers associated with hardware devices via database interface module 252 of an operating system of the computing device. In the example of FIG. 2, communication module 212 may receive temperature values 234 from expansion card driver 248, associated with expansion card 240, via database interface module 252 of OS module 250. In such examples, database 110 may store a temperature value 234 received with communication module 212 in an object of database 110, such as object 230.

Computing device 200 also includes a health controller 160 that may receive operational parameter values for hardware devices and directly or indirectly control operational parameters of computing device 200, as described above in relation to computing device 100 of FIG. 1. Health controller 160 may include a combination of electronic circuitry and machine-readable instructions to manage operational parameters of computing device 200 in accordance with received operational parameter values, as described above in relation to computing device 100 of FIG. 1.

In some examples, health controller 160 may include at least one register to receive at least one value (or other information) from health driver 120 to use in determining how to control at least one operational parameter of computing device 200. In the example of FIG. 2, health controller 160 includes a plurality of such registers, including a control register 264 and a threshold register 266. In some examples, electronic circuitry of health controller 160 (e.g., a health management ASIC) may include the registers. Although FIG. 2 shows two registers of health controller 160, health controller 160 may include any number of registers. In some examples, at least one of the registers of health controller 160 to receive information from health driver 120 may be a general purpose register that is not dedicated in hardware to a fixed function (e.g., connected in hardware to receive readings of a temperature sensor), but may instead be used for any suitable purpose by machine-readable instructions (e.g., firmware) executed by the circuitry. For example, at least one of registers 264 and 266 may be a general purpose register. In other examples, at least one of the registers of health controller 160 may be a fixed function register to receive a specific type of information (e.g., temperature information). In some examples, health controller 160 may include a combination of general purpose and fixed function registers to receive information from health driver 120.

In the example of FIG. 2, health driver 120 includes an acquisition module 122 and a conversion module 124, as described above in relation to FIG. 1. Acquisition module 122 may acquire object 230 from database 110 via database interface module 252. Module 122 may query database 110 at least once, as described above in relation to FIG. 1, to discover object 230. Module 122 may query database 110 via database interface module 252. Conversion module 124 may convert the acquired object 230 into health control information 182 useable by health controller 160 and representing an operational parameter value determined by a hardware device, as described above in relation to FIG. 1 and object 130. In the example of FIG. 2, module 124 may convert acquired object 230 into health control information 182 useable by health controller 160 and representing a temperature value 234 determined by expansion card 240 and included in object 230.

In the example of FIG. 2, health driver 120 further includes a provision module 226 that may provide health control information 182 generated by module 124 to control register 264 of health controller 160. In such examples, module 124 may generate health control information 182 such that it has a format receivable by control register 264. For example, if control register 264 is an 8-bit register, then module 124 may convert object 230 into health control information 182 having an 8-bit value.

Health controller 160 comprises a control module 162 to control an operational parameter of computing device 200 in accordance with the health control information 182 received from health driver 120, as described above in relation to computing device 100 of FIG. 1. In some examples, computing device 200 may include at least one fan 215, and an operational parameter of computing device 200 controlled by module 162 may be a fan speed for fan 215. For example, module 162 may provide a fan control signal 286 to fan 215 to control the speed of fan 215. In such examples, module 162 may determine the level of signal 286 in accordance with health control information 182 received at control register 264.

In some examples, conversion module 124 may further derive threshold information 284 associated with an operational parameter value of object 230. In such examples, object 230 may include information providing context for an operational parameter value of object 230, as described above in relation to object 130 of FIG. 1. For example, object 230 may include a temperature value 234 (e.g., an operational parameter value), and value range information 236. In some examples, value range information 236 may indicate an acceptable range for value 234, a critical limit for value 234, or the like, or a combination thereof.

In such examples, module 124 may derive threshold information 284 from range value information 236. For example, module 124 may derive threshold information 284 representing an upper boundary of an acceptable range for value 234, a critical limit for value 234, or the like, based on information 236. In some examples, module 124 may generate information 284 in a format receivable by threshold register 266 (e.g., an 8-bit data value). In such examples, provision module 226 may provide threshold information 284 to a threshold register 266 of health controller 160.

In some examples, health controller 160 may control an operational parameter of computing device 200 in accordance with health control information 182 and threshold information 284. For example, health control information 182 may represent temperature value 234 and threshold information 284 may represent a range or critical limit for value 234. In such examples, control module 162 may compare health control information 182 received at register 264 to threshold information 284 received at register 266 to determine a level for fan control signal 286. For example, module 162 may increase the speed of fan 215 via signal 286 if information 182 indicates that temperature value 234 is above the threshold represented by threshold information 284.

In other examples, health driver 120 may provide health control information, different than information 182, to register 266. In some examples, health driver 120 may provide health control information for at least one hardware device to a plurality of registers of health controller 160, respectively. For example, multiple registers of health controller 160 may receive different health control information for one hardware device, multiple registers of health controller 160 may receive health control information for different hardware devices, at least one register of health controller 160 may receive threshold information associated with provided health control information, or a combination thereof. In some examples, functionalities described herein in relation to FIG. 2 may be provided in combination with functionalities described herein in relation to any of FIGS. 1 and 3-5.

Figure 3:
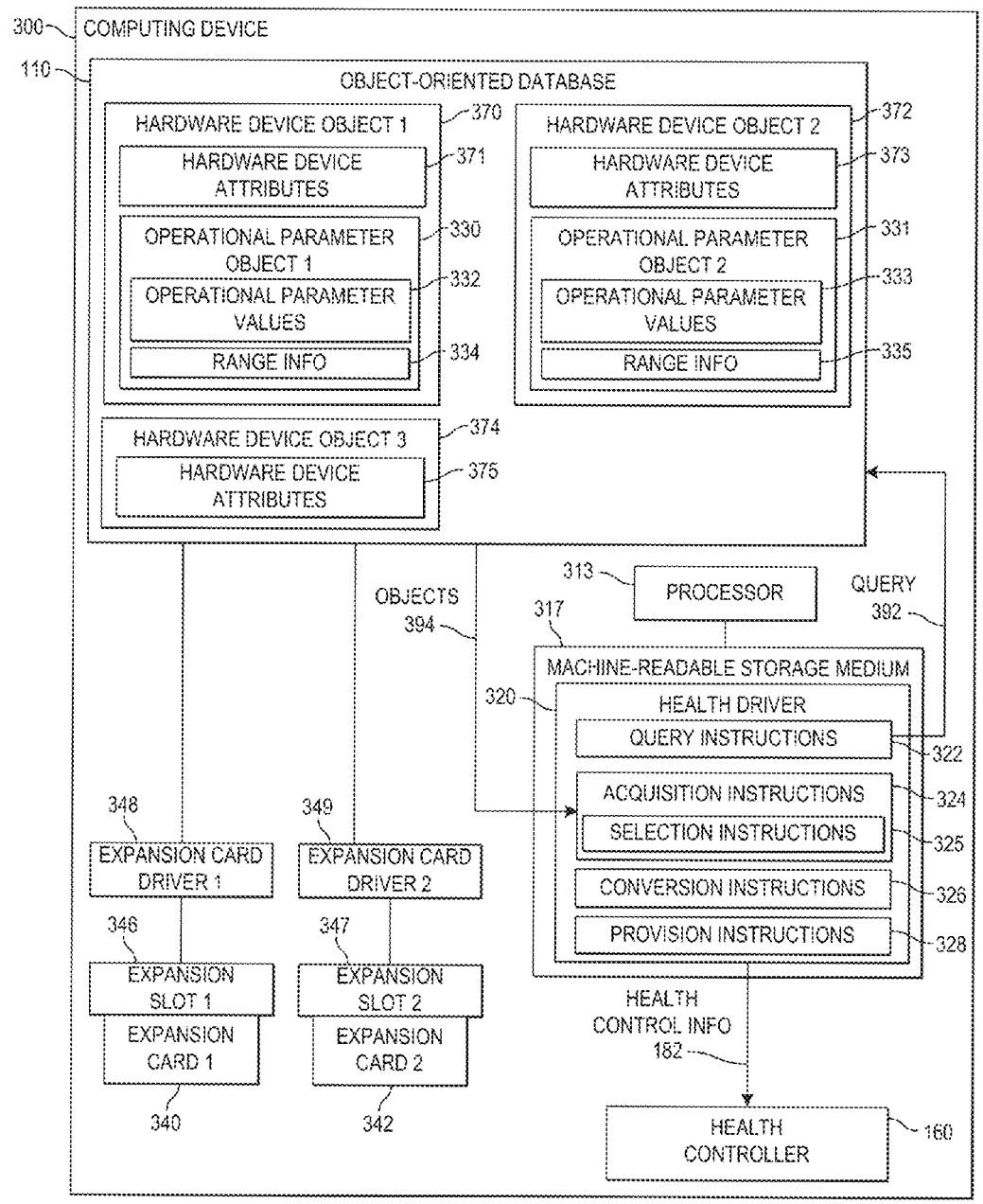
FIG. 3 is a block diagram of an example computing device to convert an object of an object-oriented database into health control information useable by a health controller.

FIG. 3 is a block diagram of an example computing device 300 to convert an object of an object-oriented database 110 into health control information 182 useable by a health controller 160. In the example of FIG. 3, computing device 300 includes an object-oriented database 110 and a health controller 160, as described above in relation to FIGS. 1 and 2. Computing device 300 also includes a processor 313 and a machine-readable storage medium 317 encoded with instructions 322, 324, 325, 326, and 328 of a health driver 320. In other examples, storage medium 317 may include additional instructions. In some examples, instructions 322, 324, 325, 326, and 328, and any other instructions described herein in relation to storage medium 317 may be stored remotely from local computing device 300. Health driver 320 may be a device driver to interface with health controller 160.

In the example of FIG. 3, processor 313 may fetch, decode, and execute instructions stored on storage medium 317 to implement the functionalities described below. In other examples, the functionalities of any of the instructions stored on storage medium 317 may be implemented in the form of electronic circuitry, in the form of executable instructions encoded on a machine-readable storage medium, or a combination thereof.

In some examples, database 110 may include an object for each of a plurality of hardware devices. For example, database 110 may include objects 370, 372, and 374, each associated with a respective hardware device and including information for the associated hardware device. Each of objects 370, 372, and 374 including hardware device information may be referred to herein as a "hardware device object".

In the example of FIG. 3, hardware device object 370 may be associated with an expansion card 340 connected to an expansion slot 346 of computing device 300. Computing device 300 may include an expansion card driver 348 (e.g., a device driver) to interface with expansion card 340. Hardware device object 372 may be associated with an expansion card 342 connected to an expansion slot 347 of computing device 300. Computing device 300 may include an expansion card driver 349 (e.g., a device driver) to interface with expansion card 342. Database 110 may also include additional hardware device objects, such as hardware device object 374 associated with another hardware device, such as a graphics card or storage device of computing device 300.

In the example of FIG. 3, object 370 may include hardware device attributes 371 indicating at least one attribute of expansion card 340 (i.e., the associated hardware device). Hardware device attributes for a hardware device may include, for example, at least one of the type of the hardware device (e.g., video card, audio card, storage device, etc.), the vendor of the device, an identification of an expansion slot to which the device is connected, power consumption attributes of the device, or any other attribute of the device, or a combination thereof. Hardware device object 372 may include hardware device attributes 373 indicating at least one attribute of expansion card 342 associated with object 372, and hardware device object 374 may include hardware device attributes 375 indicating at least one attribute of the hardware device associated with object 374.

In some examples, hardware device objects 370 and 372 may additionally include objects 330 and 331, respectively, each including at least one operational parameter value for an associated hardware device and determined by the associated hardware device. Objects 330 and 331 including operational parameter values may each be referred to herein as an "operational parameter object". In the example of FIG. 3, operational parameter object 330 may include at least one operational parameter value 332 for expansion card 340 associated with object 370. For example, database 110 may store operational parameter values 332 determined by expansion card 340 and received from driver 348 in operational parameter object 330. Similarly, in some examples, database 110 may store operational parameter values 333 determined by expansion card 342 and received from driver 349 in operational parameter object 331. In the example of FIG. 3, drivers 348 and 349 may communicate with database 110 as described above in relation to FIG. 2. In some examples, some hardware device objects of database 110, such as hardware device object 374, may not include an operational parameter object.

In the example of FIG. 3, instructions 322 may query database 110 as described above in relation to FIG. 1. In the example of FIG. 3, instructions 322 may query database 110 for identification of any hardware device of a specified type connected to computing device 300. For example, instructions 322 may query database 110 for identification of video cards, or any other type of device. In some examples, database 110 may determine from hardware device attributes of hardware device objects whether a hardware device associated with the object is a device of the specified type. Instructions 322 may receive the identification of hardware devices of the specified type from database 110. Instructions 322 may query database 110 via query communications 392. Instructions executed by processor 313 may communicate with database 110 as described above in relation to health driver 120 of FIGS. 1 and 2.

After instructions 322 receive the identification of hardware devices, instructions 324 may acquire from database 110 an operational parameter object for each of at least one hardware device of the specified type identified by database 110 and for which an operational parameter object is stored in database 110. For example, if instructions 322 query database 110 for graphics cards, and database 110 identified expansion card 340 associated with hardware device object 370 in response, instructions 324 may acquire operational parameter object 330 of hardware device object 370 via at least one object communication 394.

Instructions 326 may convert the acquired operational parameter object 330 into health control information 182 representing an operational parameter value 332 for a hardware device associated with object 330, determined by the hardware device, and included in operational parameter object 330. In such examples, instructions 326 may convert object 330 into health control information 182 useable by health controller 160 to control an operational parameter of computing device 300, as described above in relation to conversion module 124 of FIG. 1. In some examples, instructions 326 may convert the acquired operational parameter object 330 into health control information 182 by converting an operational parameter value 332 into a format useable by health controller 160 in accordance with information included in object 330 that provides context for the operational parameter value 332. In such examples, in addition to including at least one operational parameter value, operational parameter objects may include context information for at least one of the operational parameter values, such as range information associated with at least one of the operational parameter values.

In the example of FIG. 3, for example, operational parameter object 330 may include range information 334 for at least one operational parameter value 332, and operational parameter object 331 may include range information 335 for at least one operational parameter value 333. In such examples, instructions 326 may convert the acquired operational parameter object 330 into health control information 182 by converting an operational parameter value 332 into a format useable by health controller 160 in accordance with range information 334.

In some examples, instructions 326 convert object 330 to health control information 182 that represents the operational parameter value 332 as a proportion of a value range indicated by range information 334. In such examples, instructions 326 may, in this manner, normalize the operational parameter value 332 based on the range indicated by range information 334. In some examples, instructions 326 may also generate the health control information 182 in a format acceptable to a register of health controller 160 (e.g., a general purpose or fixed function register).

For example, registers of health controller 160 may be 8-bit registers that may receive values between 0 and 255. In such examples, instructions 326 may convert object 330 to health control information 182 representing the operational parameter value 332 as a proportion of a value range indicated by range information 334 in an 8-bit format. In such examples, instructions 326 may convert an operational parameter value ("V") 332 to health control information ("H") 182 that is a normalized, 8-bit value representing the value as a proportion of a value range including an lower limit ("LL") and an upper limit ("UL") according to the equation [(V−LL)/(UL−LL)*255]=H. For example, operational parameter object 330 may include a temperature value 332 (e.g., 80 degrees Celsius) for expansion card 340 (e.g., a GPU) and determined by expansion card 340, and may also include range information 334 indicating an acceptable range (e.g., 5-120 degrees Celsius) for the temperature value 332 for expansion card 340. In such examples, instructions 326 may convert the temperature value 332 to health control information 182 that is a normalized, 8-bit value according to the above equation (e.g., [(80−5)/(120−5)*255]=166).

Instructions 328 may provide heath control information 182 to health controller 160 as described above in relation to provision module 226 of FIG. 2. Health controller 160 may control an operational parameter of computing device 300 in accordance with the received health control information 182 as described above in relation to FIGS. 1 and 2.

In other examples, in response to a query by instructions 322 for identification of any hardware device of a specified type connected to computing device 300, database 110 may identify a plurality of hardware devices of the type specified by instructions 322. In such examples, instructions 322 may determine, for each hardware device of the specified type identified by database 110, whether an operational parameter object associated with the hardware device is stored in database 110. For example, instructions 322 may query database 110 to determine, for each identified device, whether database 110 includes an operational parameter object for the device. In some examples, hardware device objects of database 110 may include different operational parameter objects for different types of operational parameter values. For example, a hardware device object including a temperature value may include a temperature object to store the temperature value, a hardware device object including power consumption values may include a power object to store the power consumption values, and the like. In such examples, instructions 322 may query database 110 to determine, for the identified hardware devices, whether the device includes a particular type of operational parameter object, such as a temperature object.

In some examples, instructions 324 comprise selection instructions 325 and may trigger selection instructions 325 if it is determined that respective operational parameter objects are stored in the database for a plurality of hardware devices identified by the database in response to a query for hardware devices of a specified type. In some examples, health controller 160 may not have enough registers to receive health control information 182 for each hardware device having an associated operational parameter object. In such examples, selection instructions 325 may select at least one target hardware device for which to provide control information to available registers of health controller 160. For example, in response to queries of instructions 322, database 110 may indicate that hardware device objects 370 and 372 include operational parameter objects 330 and 331, respectively. In response, instructions 324 may determine that operational parameter objects are stored in database 110 for a plurality of hardware devices of the specified type and trigger selection instructions 325.

Instructions 325 may identify a target hardware device among the plurality of hardware devices identified by database 110 based on respective attributes of the identified hardware devices. For example, instructions 325 may identify a target hardware device based on the hardware device attributes included in the hardware device objects associated with the identified hardware devices. For example, instructions 325 may select a hardware device of interest to health controller 160 based on the device vendor, expansion slot to which the device is connected, the power consumption information for the device, or the like, or a combination thereof. Instructions 325 may also acquire, via an object communication 394, the operational parameter object associated with the identified target hardware device. In such examples, instructions 326 may convert the acquired operational parameter object into health control information 182 which instructions 328 may provide to health controller 160. In some examples, instructions 325 may select a plurality of target hardware devices based on how may registers of health controller 160 are available to receive information from health driver 320.

In other examples, if instructions 324 determine that respective operational parameter objects are stored in the database for a plurality of hardware devices identified by database 110, instructions 324 may acquire the operational parameter objects for the plurality of hardware devices. For example, instructions 324 may acquire the objects via at least one object communication 394. However, health controller 160 may not have enough registers to receive health control information 182 converted from each of the operational parameter objects. In such examples, instructions 326 may convert each of the operational parameter objects into health control values each representing an operational parameter value of one of the objects and select at least one of the health control values to provide to available registers of health controller 160.

For example, instructions 326 may convert each of the acquired operational parameter objects (e.g., objects 330 and 331) into health control values each representing an operational parameter value from a respective operational parameter object. In some examples, instructions 326 may convert the objects into health control values as described above in relation to converting objects into health control information with conversion module 124 of FIG. 1. After converting the acquired operational parameter objects, instructions 326 may select at least one of the health control values based on the respective magnitudes of the health control values. In some examples, the number of values selected is based on the number of registers available at health controller 160. Instructions 328 may provide the selected health control values to health controller 160 as health control information 182.

In some examples, instructions may select the greatest health control value among those generated. For example, instructions 326 may convert each of the acquired operational parameter objects into a health control value representing an operational parameter value (e.g., a temperature value) included in one of the objects as a value normalized to represent the value as a proportion of a range indicated in the object for the operational parameter value. In such examples, after converting the objects, instructions 326 may select the largest health control value or values, and instructions 328 may provide the selected values to health controller 160 as health control information 182. In some examples, functionalities described herein in relation to FIG. 3 may be provided in combination with functionalities described herein in relation to any of FIGS. 1-2 and 4-5.

FIG. 4 is a flowchart of an example method 400 for controlling an operational parameter of a computing device with a health controller of the computing device. Although execution of method 400 is described below with reference to computing device 200 of FIG. 2, other suitable components for execution of method 400 can be utilized (e.g., computing device 100 or 300). Additionally, method 400 may be implemented in the form of executable instructions encoded on a machine-readable storage medium, in the form of electronic circuitry, or a combination thereof.

At 405 of method 400, a hardware device coupled to computing device 200 may determine an operational parameter value for the hardware device. For example, the hardware device may be an expansion card 240 connected to an expansion slot 246 of computing device 200. In some examples, the operational parameter value may be a temperature value 234 for expansion card 240 determined with a temperature sensor 244 of expansion card 240. In other examples, expansion card 240 may determine a value for a different operational parameter of expansion card 240.

At 410, a driver for the hardware device may store the determined operational parameter value in an object 230 of an object-oriented database 110 of computing device 200. The driver may be, for example, an expansion card driver 248 to interface with expansion card 240. In some examples, the driver 248 may store the determined operational parameter value (e.g., temperature value 234) in object 230. At 415, a health driver 120 to interface with a health controller 160 of computing device 200 may acquire the object 230 from database 110. Drivers 248 and 120 may communicate with database 110 as described above in relation to FIG. 2.

At 420, health driver 120 may convert the acquired object 230 into health control information 182 useable by health controller 160 and representing the operational parameter value stored in object 230, as described above in relation to FIG. 1. For example, the health control information 182 may represent the temperature value 234 determined by expansion card 240. At 425, the health controller 160 may control an operational parameter of computing device 200 in accordance with the health control information 182. For example, health controller 160 may control the speed of a fan 215 of computing device 200 in accordance with the value of health control information 182, as described above in relation to FIG. 2.

FIG. 5 is a flowchart of an example method 500 for acquiring an updated object for a hardware device after the lapse of an update time period. Although execution of method 500 is described below with reference to computing device 200 of FIG. 2, other suitable components for execution of method 500 can be utilized (e.g., computing device 100 or 300). Additionally, method 500 may be implemented in the form of executable instructions encoded on a machine-readable storage medium, in the form of electronic circuitry, or a combination thereof.

At 505 of method 500, a hardware device coupled to computing device 200 may determine an operational parameter value for the hardware device. For example, an expansion card 240 connected to an expansion slot 246 of computing device 200 may determine an operational parameter for the expansion card 240. At 510, a driver for the hardware device (e.g., expansion card driver 248) may store the determined operational parameter value in an object 230 of an object-oriented database 110 of computing device 200. At 515, a health driver 120 to interface with a health controller 160 of computing device 200 may acquire the object 230 from database 110. Drivers of computing device 200 may communicate with database 110 as described above in relation to FIG. 2.

At 520, health driver 120 may determine an update time period for the operational parameter value based on an update rate indicated in the acquired object 230. For example, the acquired object may include a rate at which the operational parameter value (e.g., temperature value 234) is updated in object 230. In other examples, the acquired object 230 may not include an update rate for the operational parameter value. In such examples, health driver 120 may set the update time period for the operational parameter value to a default time period specified in health driver 120, or otherwise determine for itself the update time period for the operational parameter value. At 525, health driver 120 may convert the acquired object 230 into health control information 182 useable by health controller 160 and representing the operational parameter value (e.g., temperature value 234) stored in object 230, as described above in relation to FIG. 1. Health driver 120 may further provide the health control information 182 to health controller 160. At 530, the health controller 160 may control an operational parameter of computing device 200 in accordance with the received health control information 182, as described above in relation to FIG. 2.

At 535, health driver 120 may determine whether the update time period has lapsed since acquiring the object 230. If not, health driver 120 may continue to check whether the update time period has lapsed. If the updated time period has lapsed, then method 500 may proceed to 515, where health controller 120 may acquire an updated object 230 for the hardware device (e.g., expansion card 240) from the database 110. In such examples, the driver for the hardware device may update the operational parameter value with a new value determined by the hardware device. In some examples, method 500 may proceed to 520 and determine a new update time period based on an update rate included in the updated object 230. In other examples, method 500 may proceed to 525 without determining the update time period, if health controller 120 has already determined an update time period for the operational parameter value.

At 525, health driver 120 may convert the updated object 230 into updated health control information 182 useable by health controller 160 and representing an updated operational parameter value included in the updated object 230. Health driver 120 may provide the updated health control information 182 to health controller 160. At 530, health controller 160 may control the operational parameter of computing device 200 in accordance with the updated health control information 182. In this manner, health driver 120 may periodically generate updated health control information based on updated operational parameter values.

What is claimed is:

1. A computing device comprising:
an object-oriented database to store, in an object of the database associated with a hardware device: an operational parameter value for the hardware device and determined by the hardware device, and context information for the operational parameter value;
a health controller; and
a health driver to interface with the health controller, the health driver to:
acquire the object from the database;
convert the acquired object into health control information useable by the health controller and representing the operational parameter value determined by the hardware device;
derive a threshold based on the context information in the acquired object,
wherein the health controller is to control an operational parameter of the computing device in accordance with the health control information and the threshold as received from the health driver.

2. The computing device of claim 1, further comprising:
an expansion port to receive the hardware device, wherein the hardware device comprises an expansion card;
wherein the database is to receive the operational parameter value from an expansion card driver to interface with the expansion card.

3. The computing device of claim 2, wherein:
the hardware device includes a temperature sensor to determine a temperature adjacent a processor of the hardware device;
the operational parameter value for the hardware device comprises a temperature value determined with the temperature sensor; and
the operational parameter of the computing device comprises a fan speed for a fan of the computing device.

4. The computing device of claim 2, further comprising an operating system, wherein the database is
to receive the operational parameter value from a device driver associated with the hardware device via a database interface of the operating system of the computing device.

5. The computing device of claim 1, the health driver to further:
provide the health control information to a first register of the health controller, the health control information having a format receivable by the first register, and
provide the threshold to a second register of the health controller.

6. The computing device of claim 5, wherein:
the first and second registers are general purpose registers.

7. The computing device of claim 1, wherein the health driver is to:
query the database for an identification of hardware devices of a given type;
receive the identification of the hardware devices of the given type identified by the database based on hardware device attributes in objects stored by the database;
select a first hardware device of the hardware devices, wherein the acquired object is for the selected first hardware device.

8. The computing device of claim 1, wherein the health driver is to:
query the database for an identification of hardware devices of a given type;

receive the identification of the hardware devices of the given type identified by the database based on hardware device attributes in objects stored by the database; and query the database to determine, for a first hardware device of the hardware devices, whether the database stores a first type of object, from among plural different types of objects, for the first hardware device, wherein the acquired object is the first type of object for the first hardware device.

9. The computing device of claim 1, wherein the context information comprises an acceptable range or a critical limit for the operational parameter value.

10. A non-transitory machine-readable storage medium encoded with instructions executable by a processor of a computing device, the storage medium comprising instructions to:

query an object-oriented database of the computing device for identification of any hardware device of a specified type connected to the computing device;

acquire from the database an operational parameter object for a hardware device of the specified type identified by the database and for which an operational parameter object is stored in the database, wherein the acquired operational parameter object includes range information associated with an operational parameter value;

convert the acquired operational parameter object into health control information representing the operational parameter value for the hardware device, determined by the hardware device, and included in the operational parameter object, wherein the health control information is useable by a health controller to control an operational parameter of the computing device, the health control information represents the operational parameter value as a proportion of a value range indicated by the range information, and provide the heath control information to the health controller.

11. The storage medium of claim 10, wherein the instructions to query comprise instructions to:

determine, for each hardware device of the specified type identified by the database, whether an operational parameter object for the hardware device is stored in the database.

12. The storage medium of claim 11, wherein the instructions to acquire comprise selection instructions, and instructions to trigger the selection instructions if it is determined that respective operational parameter objects are stored in the database for a plurality of hardware devices identified by the database, the selection instructions comprising instructions to:

identify a target hardware device among the plurality of hardware devices based on respective attributes of the identified hardware devices; and acquire the operational parameter object associated with the target hardware device.

13. The storage medium of claim 11, wherein the instructions to acquire comprise instructions to:

acquire, if it is determined that respective operational parameter objects are stored in the database for a plurality of hardware devices identified by the database, the respective operational parameter objects for the plurality of hardware devices.

14. The storage medium of claim 13, wherein:

the instructions to convert comprise instructions to:
convert the acquired operational parameter objects into health control values each representing an operational parameter value included in a respective one of the operational parameter objects; and select one of the health control values based on the respective magnitudes of the health control values; and the instructions to provide comprise instructions to provide the selected health control value to the health controller as the health control information.

15. A method comprising:

determining, with a hardware device coupled to a computing device, an operational parameter value for the hardware device;

storing, with a driver for the hardware device, the determined operational parameter value in an object of an object-oriented database of the computing device, the object further storing context information for the operational parameter value;

acquiring the object from the database with a driver for a health controller of the computing device;

converting, with the driver for the health controller, the acquired object into health control information useable by the health controller and representing the operational parameter value;

deriving, by the driver for the health controller, a threshold based on the context information in the acquired object; and controlling, with the health controller, an operational parameter of the computing device in accordance with the health control information and the threshold.

16. The method of claim 15, further comprising:

determining an update time period for the operational parameter value based on an update rate indicated in the object; and acquiring an updated object for the hardware device from the database after a lapse of the update time period since acquiring the object.

17. The method of claim 16, further comprising:

converting, with the driver for the health controller, the updated object into updated health control information useable by the health controller and representing an updated operational parameter value included in the updated object; and controlling, with the health controller, the operational parameter of the computing device in accordance with the updated health control information.

18. The method of claim 15, further comprising:

querying, by the driver for the health controller, the database for an identification of hardware devices of a given type;

receiving, by the driver for the health controller, the identification of the hardware devices of the given type identified by the database based on hardware device attributes in objects stored by the database; and selecting, by the driver for the health controller, a first hardware device of the hardware devices, wherein the acquired object is for the selected first hardware device.

19. The method of claim 15, further comprising:

querying, by the driver for the health controller, the database for an identification of hardware devices of a given type;

receiving, by the driver for the health controller, the identification of the hardware devices of the given type identified by the database based on hardware device attributes in objects stored by the database; and querying, by the driver for the health controller, the database to determine, for a first hardware device of the hardware devices, whether the database stores a first type of object, from among plural different types of objects, for the first hardware device, wherein the acquired object is the first type of object for the first hardware device.

\* \* \* \* \*

UNITED STATES PATENT AND TRADEMARK OFFICE
CERTIFICATE OF CORRECTION

| | | |
|---|---|---|
| PATENT NO. | : 9,710,541 B2 | Page 1 of 1 |
| APPLICATION NO. | : 14/384727 | |
| DATED | : July 18, 2017 | |
| INVENTOR(S) | : Andrew L. Wiltzius et al. | |

It is certified that error appears in the above-identified patent and that said Letters Patent is hereby corrected as shown below:

On the Title Page

In item (75), Inventor, in Column 1, Line 1, delete "Andrew L. Witizius" and insert -- Andrew L. Wiltzius --, therefor.

In the Claims

In Column 17, Line 36, in Claim 10, delete "information," and insert -- information; --, therefor.

Signed and Sealed this
Seventeenth Day of October, 2017

Joseph Matal
*Performing the Functions and Duties of the
Under Secretary of Commerce for Intellectual Property and
Director of the United States Patent and Trademark Office*